(12) United States Patent
Ransom et al.

(10) Patent No.: US 12,549,799 B2
(45) Date of Patent: Feb. 10, 2026

(54) METHODS AND SYSTEMS FOR PROVIDING CONTENT

(71) Applicant: Comcast Cable Communications, LLC, Philadelphia, PA (US)

(72) Inventors: Mumin Ransom, Philadelphia, PA (US); Philip John Stroffolino, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 18/894,962

(22) Filed: Sep. 24, 2024

(65) Prior Publication Data

US 2025/0016397 A1 Jan. 9, 2025

Related U.S. Application Data

(63) Continuation of application No. 17/865,134, filed on Jul. 14, 2022, now Pat. No. 12,126,852, which is a continuation of application No. 16/410,920, filed on May 13, 2019, now Pat. No. 11,418,833, which is a continuation of application No. 14/570,243, filed on Dec. 15, 2014, now Pat. No. 10,341,713.

(51) Int. Cl.
| | |
|---|---|
| H04N 21/43 | (2011.01) |
| H04N 21/2387 | (2011.01) |
| H04N 21/431 | (2011.01) |
| H04N 21/472 | (2011.01) |
| H04N 21/6587 | (2011.01) |
| H04N 21/81 | (2011.01) |

(52) U.S. Cl.
CPC ... *H04N 21/43072* (2020.08); *H04N 21/2387* (2013.01); *H04N 21/4316* (2013.01); *H04N 21/47217* (2013.01); *H04N 21/6587* (2013.01); *H04N 21/812* (2013.01)

(58) Field of Classification Search
CPC .................................................. H04N 21/4307
See application file for complete search history.

(56) References Cited

U.S. PATENT DOCUMENTS

| | | | |
|---|---|---|---|
| 4,638,360 A | 1/1987 | Christopher et al. | |
| 4,652,908 A | 3/1987 | Fling et al. | |
| 5,778,187 A | 7/1998 | Monteiro et al. | |
| 9,066,131 B1* | 6/2015 | Arsenault | H04N 21/4333 |
| 10,341,713 B2 | 7/2019 | Ransom et al. | |
| 2004/0103429 A1* | 5/2004 | Carlucci | H04N 21/44016 |
| | | | 348/E5.002 |
| 2005/0132398 A1 | 6/2005 | Baran et al. | |
| 2011/0243533 A1* | 10/2011 | Stern | H04N 21/812 |
| | | | 725/36 |

(Continued)

OTHER PUBLICATIONS

U.S. Appl. No. 17/865,134 (2022/0353568), filed Jul. 14, 2022 (Nov. 3, 2022), Mumin Ransom (Comcast Cable Communications, LLC).

(Continued)

*Primary Examiner* — Michael H Hong
(74) *Attorney, Agent, or Firm* — Ballard Spahr LLP

(57) ABSTRACT

Disclosed are methods and systems for causing display of alternative content. The alternative content may be determined by a computing device. The computing device may cause output of the alternative content.

26 Claims, 9 Drawing Sheets

(56) References Cited

U.S. PATENT DOCUMENTS

2015/0067714 A1   3/2015   Bhogal et al.
2016/0173942 A1   6/2016   Ransom et al.

OTHER PUBLICATIONS

U.S. Appl. No. 16/410,920 (U.S. Pat. No. 11,418,833), filed May 13, 2019, (Aug. 16, 2022), Mumin Ransom (Comcast Cable Communications, LLC).
U.S. Appl. No. 14/570,243 (U.S. Pat. No. 10,341,713), filed Dec. 15, 2014 (Jul. 2, 2019), Mumin Ransom (Comcast Cable Communications, LLC).

* cited by examiner

METHODS AND SYSTEMS FOR PROVIDING CONTENT

CROSS REFERENCE TO RELATED PATENT APPLICATIONS

This application claims priority under 35 U.S.C. § 120 to, and is a continuation of, U.S. patent application Ser. No. 17/865,134 filed Jul. 14, 2022, which claims priority under 35 U.S.C. § 120 to, and is a continuation of, U.S. patent application Ser. No. 16/410,920 filed May 13, 2019, (now U.S. Pat. No. 11,418,833), which claims priority under 35 U.S.C. § 120 to, and is a continuation of, U.S. patent application Ser. No. 14/570,243 filed Dec. 15, 2014 (now U.S. Pat. No. 10,341,713) the entire contents of each of which are hereby incorporated herein by reference for all purposes.

BACKGROUND

Content consumers utilize media controls (e.g., fast forward, fast rewind) when consuming content. In digital media systems the media controls utilize trick play operations, which mimic analog media control feedback (e.g. visual increased frame speed). Oftentimes content will contain advertisements and consumers will perform a media control operation in an attempt to skip the advertisements. In so doing, the consumer will be presented with a blur of activity on the screen as the underlying trick play operation is being performed and the trick play operation may actually interfere with viewing the content. For example, the media control might be a fast forward operation that goes beyond the advertisements and fast forwards into the content. The consumer will need to rewind in order to begin watching the content that immediately follows the advertisements. The end result is that advertisements are often not watched during media control and consumers are inconvenienced by "overshooting" into content. These and other shortcomings are addressed in the present disclosure.

SUMMARY

It is to be understood that both the following general description and the following detailed description are exemplary and explanatory only and are not restrictive, as claimed. Provided are methods and systems for providing content. More particularly, provided are methods and systems for causing display of content to a user while the user performs a media control request (e.g. fast forward request, fast rewind request). The content can be caused to be displayed based on a speed of the media control request (e.g., 2×, 4×, etc. . . . ) and/or a time remaining until the anticipated end of the media control request. For example, if a user performs a media control request (e.g., fast-forward) while advertisements are being caused to be displayed to the user, a second advertisement can be caused to be displayed for the duration of the media control request (e.g., while the user is fast-forwarding).

In another example, when a user performs a media control request that utilizes a trick play operation (e.g., a fast forward request, a fast rewind request) while a first content item (e.g., a first advertisement) is being outputted for display, a second content item (e.g., a second advertisement) can be determined. The first content item and the second content item can then be caused to be displayed simultaneously while the media control request is being performed. The first content item can be caused to be displayed according to a requested viewing speed of the media control request (e.g., 4 times of viewing speed), and the second content item can be caused to be displayed at another viewing speed (e.g., normal viewing speed).

In an aspect, an example method can comprise receiving a first media control request while a first content item is being outputted for display. A time point of the first content item associated with the first media control request can be determined. A second content item can be determined based on the time point associated with the first media control request, the first content item, and a request parameter. The request parameter can comprise a requested viewing speed requested by the first media control request. The first content item and the second content item can then be caused to be displayed. The first content item and the second content item can be configured to be displayed simultaneously.

In another aspect, an example method can comprise receiving a request such as a first media control request while a first content item is being outputted for display. A time point of the first content item associated with the first media control request can be determined. If the time point associated with the first media control request is during a main portion of the first content item, then an image can be caused to be displayed until a second request is received. For example, the image can be caused to be displayed over the first content item, in place of the first content, or in combination with the first content item until the second request is received. If the time point associated with the first media control request is during an advertisement portion of the first content item, then instead of the image the advertisement portion of the first content item and a selected second content item can be caused to be displayed. The advertisement portion and the selected second content item can be configured to be displayed simultaneously until the end of the advertisement portion of the first content item.

In a further aspect, an example method can comprise receiving with a first media control request a requested viewing speed, a time point, and a first content item identifier. A content segment can be determined based on the first content item identifier. Also, a plurality of first content items associated with the content segment can be determined. The method can determine a duration of the plurality of first content items from the time point and an end point of the content segment based on the requested viewing speed. A plurality of second content items associated with the plurality of first content items can be determined and one or more of the plurality of second content items can be caused to be displayed. The one or more of the plurality of second content items can have a combined duration equal to the duration.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
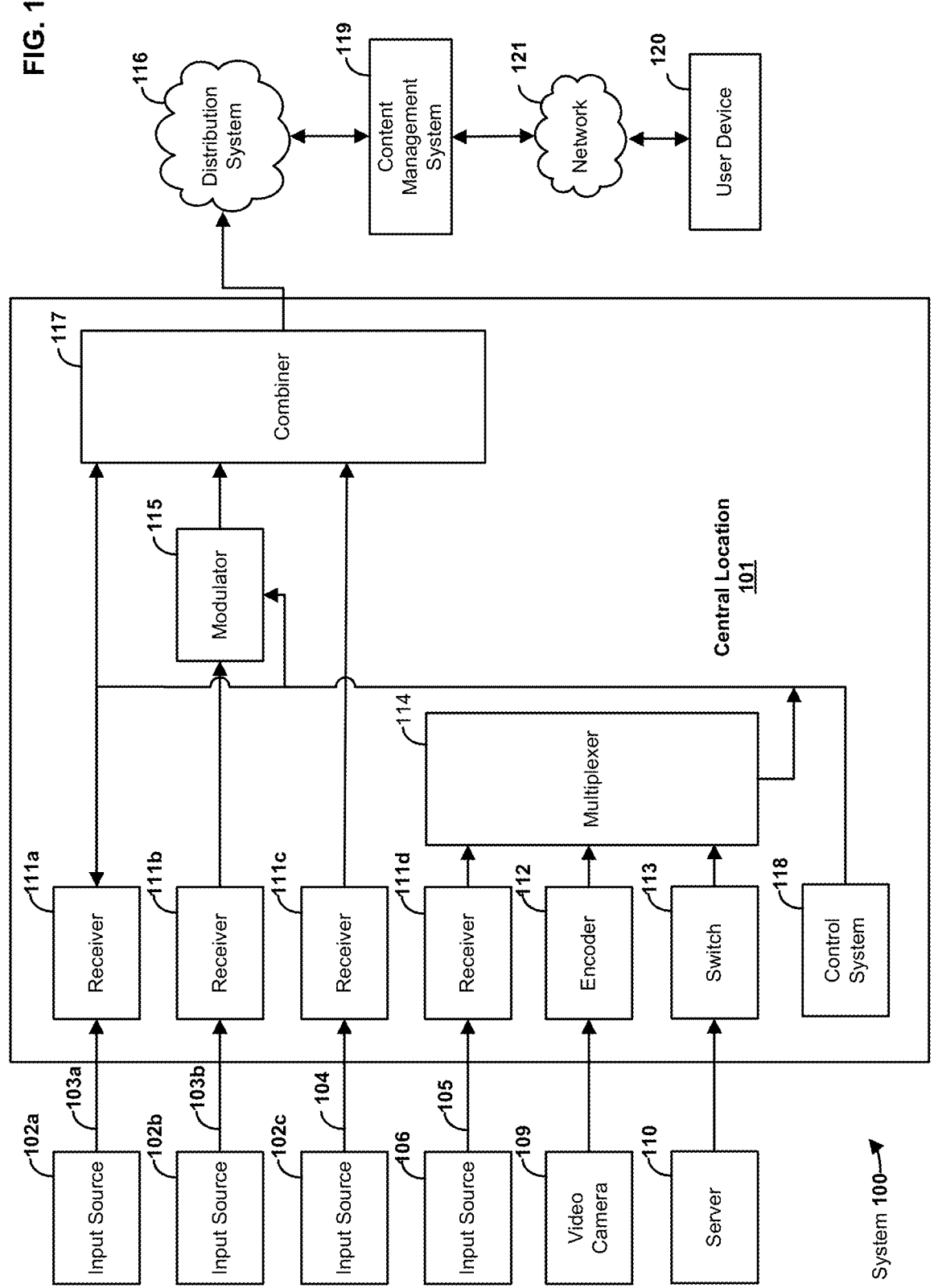
FIG. 1 is a block diagram of an exemplary system environment in which the present systems and methods can operate.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Disclosed are methods and systems for causing display of content to a user while the user performs a media control request (e.g. fast forward request, fast rewind request) on media content being outputted for display to the user. For example, while a user is consuming media content such as a recorded television show or an on-demand video, the media content can have advertisements that are a part of, or were recorded with, the media content. The user consuming the media content with the advertisements can perform media control requests (e.g. fast forward, play, stop, rewind) with the media content. When the user performs a media control request while advertisements are being outputted for display, the advertisements might not be displayed to the user (or might be displayed as a blur as a result of a trick play operation). Disclosed herein are several options to cause to be displayed an advertisement during the time it takes to perform the media control request. For example, an advertisement that is to be caused to be displayed during the media control request can be selected based on a requested viewing speed of the media control request (e.g., 2×, 4×, etc. . . . ) and an anticipated time that the user will have to view the advertisement given the requested viewing speed of the media control request.

In another example, when a user performs a media control request that utilizes a trick play operation (e.g., a fast forward request, a rewind request, a fast rewind request) while a first content item (e.g., a first advertisement) is being outputted for display, a second content item (e.g., a second advertisement) can be determined. The first content item and the second content item can be configured to be displayed simultaneously. For example, the first content item can be caused to be displayed according to the trick play operation (e.g., 4 times normal viewing speed), and the second content item can be caused to be displayed at a normal viewing speed. In some aspects, the first content item and second content item can be related. In other aspects, the first content item and second content item can be unrelated. In an aspect, the methods and systems can be utilized to display an abbreviated version of an advertisement that would have otherwise been played had the user not fast forwarded the advertisement. In another aspect, the user can be presented with a static advertisement during a fast forward period. Furthermore, the methods and systems can utilize a countdown timer to provide the user with a visual display indicating when the user should discontinue the media control request.

FIG. 1 illustrates various aspects of an exemplary system in which the present methods and systems can operate. Those skilled in the art will appreciate that present methods may be used in systems that employ both digital and analog equipment. One skilled in the art will appreciate that provided herein is a functional description and that the respective functions can be performed by software, hardware, or a combination of software and hardware.

The system 100 can comprise a central location 101 (e.g., a headend), which can receive content (e.g., data, input programming, and the like) from multiple sources. The central location 101 can combine the content from the various sources and can distribute the content to a user (e.g., subscriber) via a distribution system 116.

In an aspect, the central location 101 can receive content from a variety of sources 102a, 102b, 102c. The content can be transmitted from the source to the central location 101 via a variety of transmission paths, including wireless paths (e.g. satellite paths 103a, 103b) or a terrestrial path 104. The central location 101 can also receive content from a direct feed source 106 via a direct line 105. Other input sources can comprise capture devices, such as a video camera 109 or a server 110 (e.g., a video on-demand server, a pay-per-view server). The signals provided by the content sources can include a single content item or a multiplex that includes several content items.

As an example, content sources 102a, 102b, 102c can be any type of provider capable of sourcing media including, but not limited to, a high speed data service provider, cable, satellite, or broadcast service provider having capabilities to support linear (e.g., broadcast, switched digital video (SDV)) and non-linear (e.g., video on-demand (VOD)) modes of delivering television related services, a telephony service provider, for example, wireline, wireless, VOIP, cellular), a server, and the like.

The central location 101 can comprise one or a plurality of receivers 111a, 111b, 111c, 111d that are each associated with an input source. For example, MPEG encoders, such as an encoder 112, are included for encoding local content or a video camera 109 feed. A switch 113 can provide access to the server 110, which can be a Pay-Per-View server, a video on-demand server, a data server, an internet router, a network system, a phone system, and the like. Some signals may require additional processing, such as signal multiplexing, prior to being modulated. Such multiplexing can be performed by a multiplexer (mux) 114.

The central location 101 can comprise one or a plurality of modulators 115 for interfacing to the distribution system 116. The modulators 115 can convert the received content into a modulated output signal suitable for transmission over the distribution system 116. The output signals from the modulators 115 can be combined, using equipment, such as a combiner 117, for input into the distribution system 116.

A control system 118 can permit a system operator to control and monitor functions and performance of the system 100. The control system 118 can interface, monitor, and/or control a variety of functions, including, but not limited to, the channel lineup for the television system, billing for each user, conditional access for content distributed to users, and the like. The control system 118 can provide input to the modulators 115 for setting operating parameters, such as system specific MPEG table packet organization or conditional access information. The control system 118 can be located at the central location 101 or at a remote location.

In an aspect, the distribution system 116 can distribute data (e.g., content items) from the central location 101 to a content management system 119. In an aspect, the content management system 119 can receive a first media control request (e.g., fast forward request) from a user device 120 while a first content item (e.g., a first advertisement) is being outputted for display. In an aspect, a content item can comprise playable content (e.g., video, images, audio, and combinations thereof) and content metadata. As an example, content metadata can comprise content title, content provider, content type (e.g., local advertisement, non-local advertisement), content format (e.g., digital, analog), content length (e.g., temporal data for the interval between content starting point and content ending point), content identifier (e.g., content id), content release date, content update frequency, and the like.

The content management system 119 can be configured to determine a time point associated with the first media control request (e.g., fast forward request). In another aspect, the first media control request can comprise the time point. For example, the content management system 119 can determine that the time point associated with the first media control request (e.g., fast forward request) is 40 seconds before the end of the first content item (e.g., first advertisement), that the time point is within an advertisement period of known length (e.g., content segment), and the like. In an aspect, the content management system 119 can be configured to determine a second content item based on the time point associated with the first media control request and the first content item. For example, if the time point associated with the first media control request is 40 seconds before the end of the first content item (e.g., first advertisement), and the first media control request is a 4× fast forward request, the content management system 119 can determine a second content item having a duration of 10 seconds (40 seconds divided by 4 equals 10 seconds). In an aspect, the second content item can be determined based on the first content item using, for example, pre-determined classifications/ associations. By way of example, the pre-determined classifications can be stored as metadata associated with the first content item and/or the second content item. A first content item can then be associated with one or more second content items based on the classifications. Associations can be based on, for example, content similarity (identical or similar products and/or advertisers), region, content target audience, content length, combinations thereof, and the like. For example, the second content item can be an abbreviated (e.g., 10 second) version of the first content item (e.g., the first advertisement). In another example, the second content item can be any type of advertisement, or other content.

In an aspect, the content management system 119 can poll (e.g., interrogate, query, communicate with, etc.) the central location 101 to request the determined second content item and receive the requested second content item upon request. In another aspect, the content management system 119 can comprise a storage system configured for storing a plurality of content items (e.g., a plurality of second content items) obtained from a content provider (e.g., advertiser, the central location 101). A second content item can be determined and/or retrieved from the storage system according to the metadata of the stored content items.

In an aspect, the first content item and the determined second content item can be caused to be displayed simultaneously to the user device 120 or the determined second content item can be caused to be displayed in place of the first content item. In an aspect, a network 121 coupled between the content management system 119 and the user device 120 can transmit data between the content management system 119 and the user device 120. As an example, the data can comprise a stream of content, such as a video stream, audio stream, metadata or other data associated with the stream, and/or the like transmitted from the content management system 119 to the user device 120. As another example, the data can comprise a first media control request (e.g., fast forward request) transmitted from the user device 120 to the content management system 119.

In an aspect, the distribution system 116 and the network 121 can each include one or more networks or types of networks and communication links thereto capable of carrying communications, media content, content items, and/or data signals between content provider at the central location 101, content management system 119, and the user device 120. As an example, the distribution system 116 and/or the network 121 can comprise a packet switched network (e.g., internet protocol based network), a non-packet switched network (e.g., quadrature amplitude modulation based network), and/or the like. The distribution system 116 and/or the network 121 can comprise network adapters, switches, routers, and the like connected through wireless links (e.g., radio frequency, satellite) and/or physical links (e.g., fiber optic cable, coaxial cable, Ethernet cable). In one aspect, the distribution system 116 and/or the network 121 can be configured to provide communications from a telephone, cellular devices, a modem, and/or other electronic devices to and throughout the system 100.

In an aspect, the content management system 119 can be in communication with one or more user devices 120 via the network 121. By way of example, the content management system 119 can be a personal computer, a portable computer, a smartphone, a server, a router, a network computer, a peer device or other common network node, and the like. As another example, the user device 120 can be a personal computer, communication terminal, set-top box, television, smartphone, laptop, tablet, GPS, vehicle entertainment system, multimedia playback device, portable electronic device, and the like. The user device 120 can be a widget or virtual device for displaying content in a picture-in-picture environment. In an aspect, the user device 120 does not need to be in a fixed location. In an aspect, a decoder can be coupled between the content management system 119 and the user device 120 to decode the content for display on the user device 120.

The system 100 may be implemented in various ways. For example, in an embodiment, the central location 101 and the content management system 119 can be hosted on different computer systems, and can communicate with each other through a network, for example, the distribution system 116. In another embodiment, the central location 101 and the content management system 119 can be present on the same computer system, and thus may communicate with each other in an inter-computer manner. In an aspect, the methods and systems disclosed can be located within, or performed on, one or more central locations 101, the distribution system 116, the content management system 119, the network 121, and the user device 120. In an aspect, the content management system 119 can be located at or close to a user premises. For example, the content management system 119 can be located at a neighborhood node.

Figure 2:
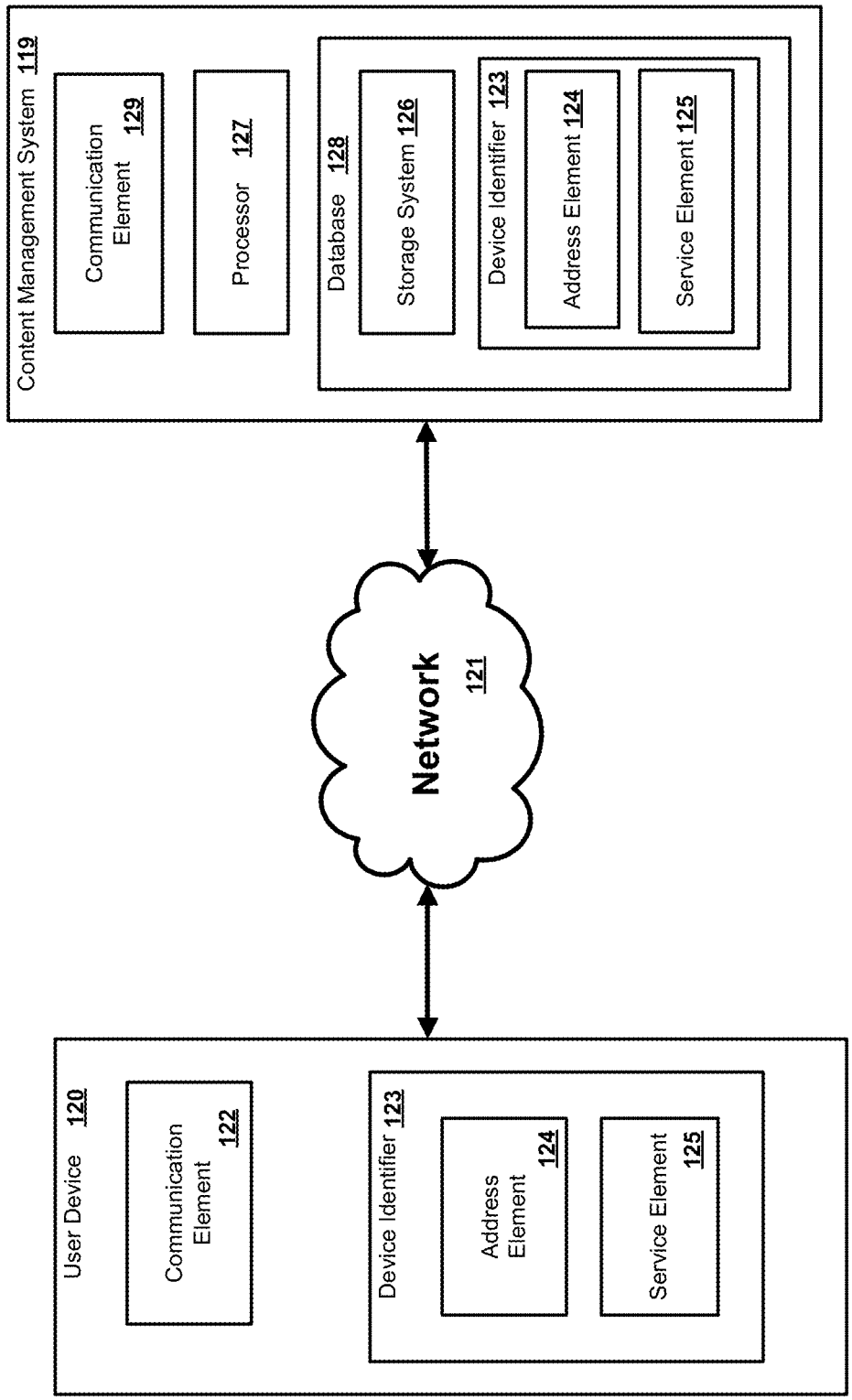
FIG. 2 is a block diagram of another exemplary system environment in which the present systems and methods can operate.

FIG. 2 illustrates an exemplary system environment in which the present systems and methods can operate. In an aspect, the content management system 119 can be in communication with the user device 120. In an aspect, the content management system 119 can be disposed locally or remotely relative to the user device 120. As an example, the user device 120 and the content management system 119 can be in communication via a private and/or public network 121, such as the Internet or a local area network. Other forms of communication can be used, such as wired and wireless telecommunication channels.

As an example, the content management system 119 can be a personal computer, a portable computer, a smartphone, a server, a router, a network computer, a peer device, other common network node, and the like. As another example, the user device 120 can be an electronic device, such as a computer, a smartphone, a laptop, a tablet, a set top box, a display device, or other device capable of communicating with the content management system 119.

In an aspect, the user device 120 can comprise a communication element 122 for providing an interface to a user to interact with the user device 120 and/or providing communicating between the user device 120 and the content management system 119. In an aspect, the communication element 122 can be any interface for presenting and/or receiving information to/from the user, such as a user request for specific content, a request for a trick play operation (and associated parameters), and the like. An example interface may be a communication interface, such as a web browser (e.g., Internet Explorer, Mozilla Firefox, Google Chrome, Safari, or the like). Other software, hardware, and/or interfaces can be used to provide communication between the user and the user device 120. In another aspect, the communication element 122 can request or query various files from a local source and/or a remote source. As an example, the communication element 122 of the user device 120 can transmit data from the user device 120 to a local or remote device, such as the content management system 119. For example, the communication element 122 can transmit a media control request (e.g., fast forward request, fast rewind request) to the content management system 119 while a first content item (e.g., a first advertisement) is being outputted for display.

In an aspect, the user device 120 can be associated with a user identifier or a device identifier 123. As an example, the device identifier 123 can be any identifier, token, character, string, or the like, for differentiating one user or user device from another user or user device. In a further aspect, the device identifier 123 can identify a user or user device as belonging to a particular class of users or user devices. As a further example, the device identifier 123 can comprise information relating to the user device, such as a manufacturer, a model or type of device, a service provider associated with the user device 120, a state of the user device 120, a locator, and/or a label or classifier. Other information can be represented by the device identifier 123. In another aspect, the device identifier 123 can be received by the content management system 119 as part of a request for a trick play operation, so that the content management system 119 can provide one or more second content items (determined by the methods disclosed herein) to the user device 120 according to its respective device identifier 123.

In an aspect, the device identifier 123 can comprise an address element 124 and a service element 125. In an aspect, the address element 124 can comprise or provide an internet protocol address, a network address, a media access control (MAC) address, an Internet address, or the like. As an example, the address element 124 can be relied upon to establish a communication session between the user device 120 and the content management system 119 or other devices and/or networks. As a further example, the address element 124 can be used as an identifier or locator of the user device 120. In an aspect, the address element 124 can be persistent for a particular network. In another aspect, the address element 124 can be received by the content management system 119 as part of the request (e.g., fast forward request) when a first content item is being outputted for display, so that the content management system 119 can provide a second content item to the user device 120 at its location according to the respective address element 124.

In an aspect, the service element 125 can comprise an identification of a service provider (e.g., internet service provider, video on demand service provider) associated with the user device 120 and/or with the class of the user device 120. The class of the user device 120 can be related to a type of device, capability of device, type of service being provided, and/or a level of service (e.g., business class, service tier, service package, etc.). In an aspect, the address element 124 can be used to identify or retrieve data from the service element 125, or vice versa. As a further example, one or more of the address element 124 and the service element 125 can be stored remotely from the user device 120 and retrieved by one or more devices, such as the user device 120 or the content management system 119. Other information can be represented by the service element 125.

In an aspect, the content management system 119 can be a network device or server for communicating with the user device 120. As an example, the content management system 119 can communicate with the user device 120 for providing data and/or services. In an aspect, the content management system 119 can allow the user device 120 to interact with remote resources, such as data, devices, and files. As an example, the content management system 119 can be configured as (or disposed at) a central location (e.g., a headend, or processing facility), which can receive content (e.g., data, input programming) from multiple sources. The content management system 119 can combine the content from the multiple sources and can distribute the content to user (e.g., subscriber) locations via a distribution system.

In an aspect, the content management system 119 can comprise a communication element 129 for providing an interface to a user to interact with the content management system 119 and/or providing communication between the user device 120 and the content management system 119. In an aspect, the communication element 129 can be any interface for presenting and/or receiving information to/from the user. In another aspect, the communication element 129 can request or query various files from a local source and/or a remote source. As an example, the communication element 129 can transmit data (e.g., content items) from the content management system 119 to the user device 120. As a further example, the communication element 129 can communicate with a content provider (e.g., advertisement provider, a central location 101) to receive content items (e.g., advertisements).

In an aspect, the content management system 119 can manage the communication between the user device 120 and a database 128 for sending and receiving data there between. As an example, the database 128 can store a plurality of files (e.g., content items), user identifiers, content identifiers, content metadata, or other information. As a further example, the user device 120 can request and/or retrieve a file from the database 128. The user device 120 can transmit requests (e.g., fast forward, rewind, fast rewind) and request parameters (e.g., requested viewing speed 2×, 3×, 4×, 5×, and the like) to the content management system 119. In an aspect, the database 128 can store information relating to the user device 120, such as the address element 124 and/or the service element 125. As an example, the content management system 119 can obtain the device identifier 123 from the user device 120 and retrieve information from the database 128, such as the address element 124 and/or the service element 125. As a further example, the content management system 119 can obtain the address element 124 from the user device 120 and can retrieve the service element 125 from the database 128, or vice versa. Any information can be stored in and retrieved from the database 128. In an aspect, the content management system 119 can retrieve content stored in the database 128 upon request for the content from user device 120. For example, the database 128 can comprise a storage system 126 configured for storing content (e.g., first content item, second content item). The database 128 can be disposed remotely from the content management system 119 and accessed via direct or indirect connection. The database 128 can be integrated with the content management system 119 or some other device or system.

In an aspect, the storage system 126 can be configured for storing content items and associated metadata. In an aspect, data related to one or more portions of the content items can be obtained from content metadata. For example, metadata associated with a content item can comprise content title, content provider (e.g., advertisement provider), content format (e.g., digital, analog), content type (e.g., national advertisement, local advertisement), content duration (e.g., temporal data for the interval between content starting point and content ending point), content identifier (e.g., content id), content release date, and the like.

In an aspect, the content management system 119 can comprise a processor 127. The processor 127 can be configured to process content. In an aspect, the processor 127 can be configured to determine time points in content according to content metadata. For example, when the content management system 119 receives a first media control request (e.g., fast forward request, fast rewind request) while a first content item (e.g., first advertisement) is being outputted for display, the processor 127 can be configured to determine time points associated with the first media control request and the first content item. In an aspect, time points can be determined by accessing metadata of the first content item. As an example, the metadata can comprise temporal data for the starting point and ending point of a first content item, duration of the first content item, and the like. For example, a time point of "10 seconds offset" can indicate 10 seconds after the starting point of the first content item. In an aspect, starting points and/or ending points can be characterized by a specific digital sequence. For example, the starting point and/or ending points can comprise Society of Cable Telecommunications Engineers (SCTE) cue packets within digital MPEG-2 content. As another example, starting points and/or ending points can comprise encoded cue tones identifying a splice point within an analog content.

The processor 127 can be configured to determine a second content item based on the duration between the time point associated with the first media control request and the end of the first content item (e.g., first advertisement). For example, if the time point associated with the first media control request is 40 seconds before the end of the first content item (e.g., first advertisement), and the first media control request is a 4× fast forward request, the content management system 119 can determine a second content item that would last, for example, 40 seconds divided by 4, resulting in 10 seconds. In another aspect, if the time point is associated with a time point at or near the starting point of the first content, and the first media control request is a 4× fast forward request, the content management system 119 can determine a second content item that would last as long as the duration of the first content item divided by 4. In an aspect, the processor 127 can determine an abbreviated version (e.g., 10-second version) of the first content item (e.g., the first advertisement) according to metadata (e.g., content theme, content type, content length) of the first and/or second content item. Similarly, if the time point associated with the first media control request (e.g. fast rewind request) is 20 seconds after the starting point of the first content item (e.g., first advertisement), and the first media control request is a 4× fast rewind request, the content management system 119 can determine a second content item that would last, for example, 20 seconds divided by 4, resulting in 5 seconds. In an aspect, the second content item can comprise one or more of a video clip, a static image, a code, a tag, a link, audio, combinations thereof, and the like.

In another aspect, the processor 127 can be configured to receive a request, a time point, and a first content item identifier from the user device 120. The request parameter can comprise a requested viewing speed (e.g., 2×, 3×, 4×, 5×, etc. . . . ). The time point can comprise a point in time during a first content item. The first content item identifier can comprise any code, text, string, and the like that can determine a first content item. The processor 127 can determine the first content item based on the first content item identifier and determine a first duration of the first content item (and/or the remaining duration) based on the time point and the first content item. In an aspect, the processor 127 can access metadata and/or one or more databases 128 comprising information related to duration of a plurality of first content items. The processor 127 can then determine a target duration based on the request parameter and the first duration. For example, the request parameter can comprise a requested viewing speed of 5× and the first duration can comprise 60 seconds. Accordingly, the target duration can be determined by dividing 60 by 5, resulting in a target duration of 12 seconds. The processor 127 can utilize the target duration to determine one or more second content items whose duration (alone or combined) equals the target duration. The processor 127 can then select at least one of the identified one or more second content items based on user information. User information can comprise user subscription information, user demographic information, viewing history, user interests (e.g., hobbies, favorite teams, political views), and/or the like. In an aspect, user information can comprise preference information. As an example, the preference information can indicate a specific user (e.g., viewer, customer) prefers a particular brand of product (e.g., a particular brand of shoes) and/or a particular class of product (e.g., automobile). Accordingly, a second content item that is relevant to the user information can be determined. In an aspect, the content items comprise advertisements and the selected one or more second content items can comprise abbreviated versions of one or more first content items.

In an aspect, the content management system 119 can request the determined second content item(s) from a content provider. In another aspect, the content management system 119 can retrieve the determined second content item(s) from the storage system 126. The content management system 119 can provide the first content item and the determined second content item simultaneously. In another aspect, the content management system 119 can provide the second content item in place of the first content item. In an aspect, the first content item can be rendered on the user device 120 at a first speed (e.g., requested trick play speed) and the second content item can be rendered on the user device at a second speed (e.g., normal viewing speed).

Figure 3A:
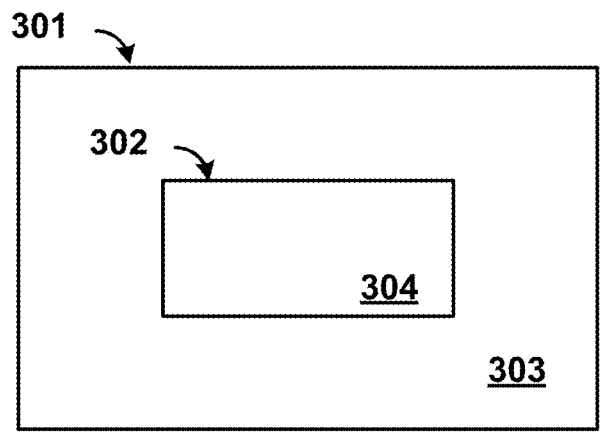
FIG. 3A is a block diagram illustrating an example of content presentation.

FIG. 3A illustrates an aspect of content presentation. As illustrated in FIG. 3A, when a media control (e.g. fast forward) request is given by a user, a first content item 303 can be caused to be displayed in a full screen 301, and a second content item 304 can be caused to be displayed in an inset 302 of the full screen 301. In an aspect, the inset 302 can be placed in a specific location of the full screen 301. For example, the specific location can be a lower left corner, a lower right corner, or center of the full screen 301. In an aspect, the first content item 303 can be caused to be displayed at a first speed according to the media control request (e.g., four times of viewing speed). The second content item 304 can be caused to be displayed at a second speed (e.g., normal viewing speed). In an aspect, other content items can be displayed in combination with the first content item 303 and the second content item 304. FIG. 3B-FIG. 3F illustrate further examples of content presentation during a media control request.

Figure 3B:
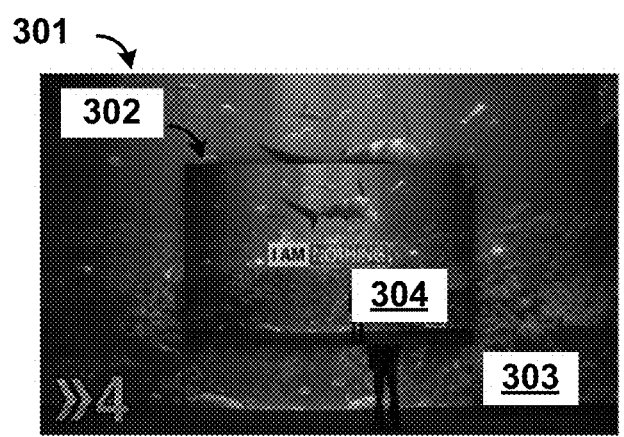
FIG. 3B is a diagram illustrating an example of content presentation according to FIG. 3A.

FIG. 3B illustrates an example of the full screen 301 and the inset 302 of FIG. 3A. FIG. 3B illustrates an example where the inset 302 displays the second content item 304 which can be a version of the first content item 303 on which the media control request is being performed. The first content item 303 can appear in the full screen 301 as the media control request is being performed. For example, the second content item 304 can be an abbreviated version of the first content item 303 (e.g. advertisement). In an aspect, a duration of the abbreviated advertisement can depend on the viewing speed of the media control request. For example, the first content item 303 in the full screen 301 can be a minute long advertisement when provided at normal viewing speed. However, if the media control request is a fast forward request of four times the normal viewing speed, then it would take fifteen seconds to fast forward through the first content item 303. Therefore, the second content item 304 in the inset 302 can be a fifteen second abbreviated advertisement. In another example, the second content item 304 in the inset 302 can be another advertisement that was or will be altered by the media control request, which is not presently being viewed in the full screen 301 as the first content item 303. In another example, the second content item 304 being displayed in the inset 302 can be an advertisement or other content item that is not any of the advertisements being fast forwarded. An example of the other content item that can be displayed is illustrated in the lower left corner of FIG. 3B, which illustrates an indication of fast forward speed. The indication can be viewed in combination with the first content item 303 and the second content item 304.

Figure 3C:
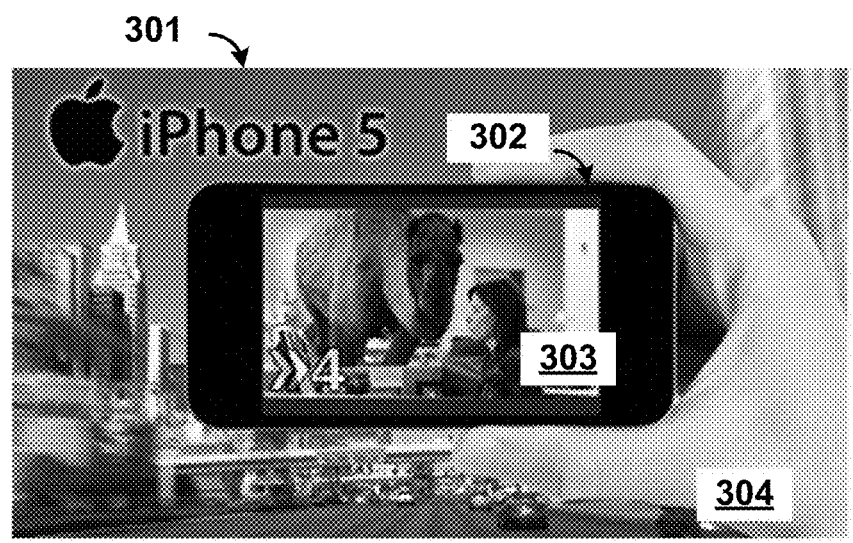
FIG. 3C is a diagram illustrating an example of content presentation according to FIG. 3A.

FIG. 3C illustrates another example of content presentation according to FIG. A. As shown in FIG. 3C, the presentation of the first content item 303 and the second content item 304, can be swapped. The first content item 303 can be caused to be displayed in the inset 302 of the full screen 301, and the second content item 304 can be caused to be displayed in the full screen 301. In the example, the inset 302 can be placed in a specific location of the full screen 301. For example, the specific location can be a lower left corner, a lower right corner, or center of the full screen 301 as is illustrated. In an aspect, the border of the inset 302 can be in the form of a device or product (e.g., a smartphone, a tablet, a PDA) intended to be advertised. The first content item 303 being fast forwarded can be caused to be displayed at a first viewing speed such as four times the normal speed as illustrated in FIG. 3C. The first viewing speed can be the requested viewing speed of the request parameter. The second content item 304, which includes the border of the inset 302, can be an advertisement provided at a second viewing speed (e.g., normal viewing speed) or a static image. In other aspects, a different media control request can be used, such as rewind.

Figure 3D:
FIG. 3D is a diagram illustrating an example of content presentation according to FIG. 3A.

FIG. 3D illustrates another example of content presentation. As illustrated in FIG. 3D, the second content item 304 can be caused to be displayed in the full screen 301, and the first content item 303 can be caused to be displayed in the inset 302 of the full screen 301. In an aspect, the inset 302 can be placed in a specific location of the full screen 301. For example, the specific location can be a lower left corner, a lower right corner, or center of the full screen 301. The lower left corner of the inset 302 of FIG. 3D illustrates an example of an indication of fast forward speed. In an aspect, the media control request can be any media control such as rewind, fast forward, skip forward, and the like. FIG. 3D illustrates a static advertisement as the second content item 304. In the example, the advertisement that is the first content item 303 is displayed in the inset 302 in the lower left hand corner and is being fast forwarded at a rate of four times the normal viewing speed. This example can be suitable for advertisers that do not have an abbreviated advertisement ready to promote, or as a replacement for advertisements in the first content item 303 that are already abbreviated when the media control request is being performed on the first content item 303.

Figure 3E:
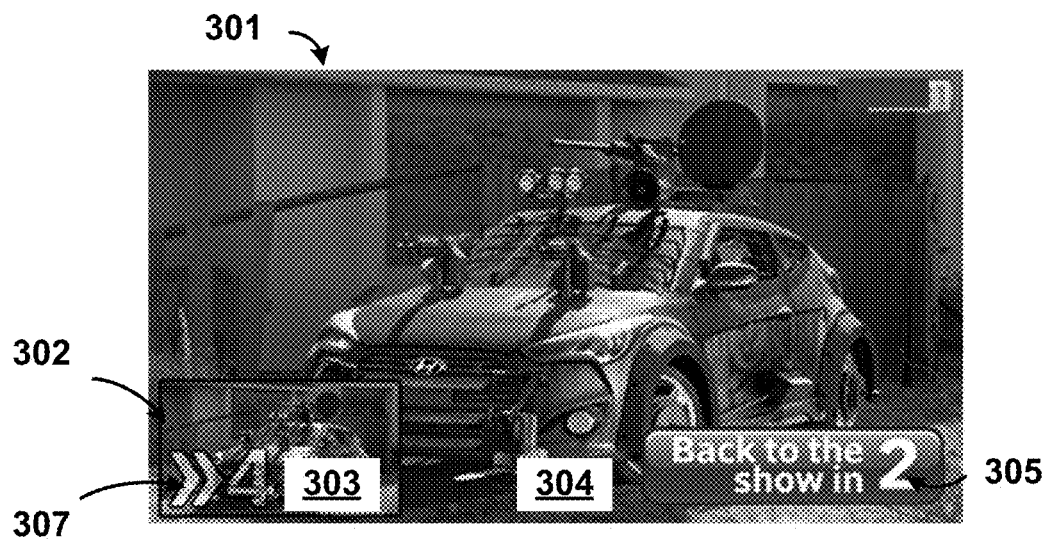
FIG. 3E is a diagram illustrating an example of content presentation according to FIG. 3A.

FIG. 3E is a diagram illustrating yet another example of content presentation. As illustrated in FIG. 3E, the first content item 303 can be caused to be displayed in the inset 302. The second content item 304 can be caused to be displayed in the full screen 301. In addition to the various forms for content presentation illustrated in FIG. 3A through FIG. 3D, a count-down timer 305 can be caused to be displayed on a specific position of a full screen, for example, the lower right corner of the full screen. The count-down timer 305 can indicate a time (e.g., 2 seconds) remaining to the end of the first content item 303 based on a viewing speed corresponding to the media control request (e.g., fast forward request). The count-down timer enables a user to know when to press "Play" to transition from the advertisement to the program without fast forwarding into the program.

Figure 3F:
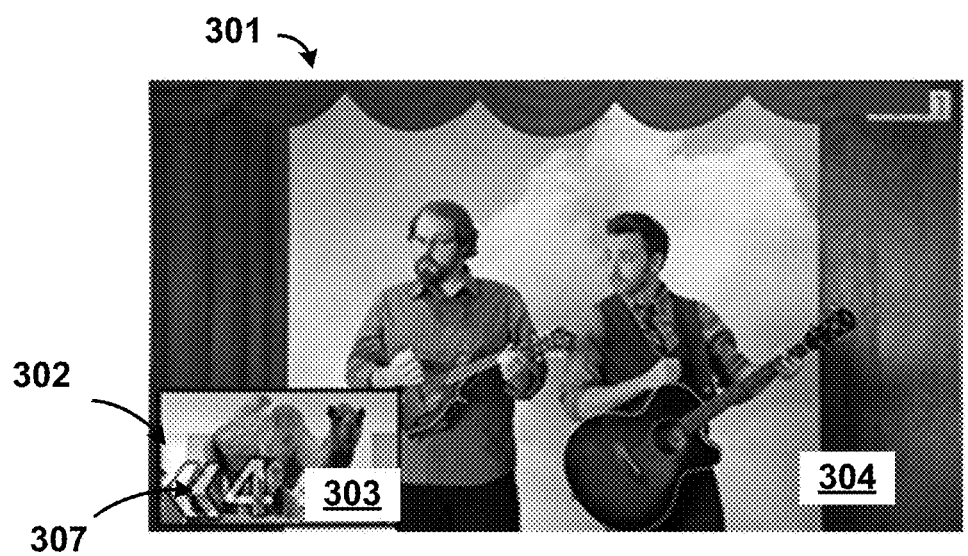
FIG. 3F is a diagram illustrating an example of content presentation according to FIG. 3A.

FIG. 3F illustrates yet another example of content presentation. As illustrated in FIG. 3F, the first content item 303 can be caused to be displayed in the inset 302. The second content item 304 can be caused to be displayed in the full screen 301. In addition to the various forms of content presentation illustrated in FIG. 3A through FIG. 3E, a speed indicator 307 can be displayed to indicate the speed at which the first content item 303 is being played. For example, when the first content item 303 is being outputted for display at four times normal viewing speed, a speed indicator 307 shown as "4×" or ">>4", and the like, can be displayed on a specific location of a screen (e.g., upper left corner, upper right corner). In the example illustrated by FIG. 3F, the first content item 303 is being rewound based on a media control request. The first content item 303 being rewound can be presented in the inset 302 while the second content item 304 can be presented in the full screen 301 but playing forward as an abbreviated advertisement at a normal viewing speed.

Figure 4:
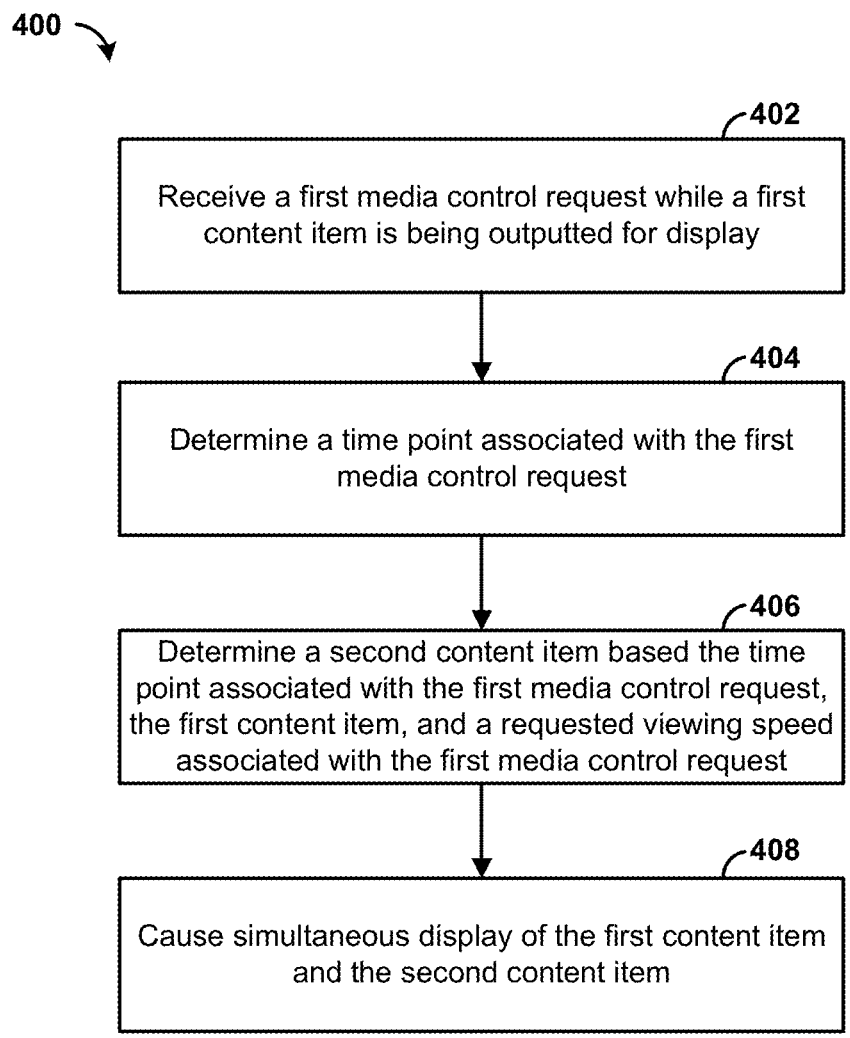
FIG. 4 is a flowchart illustrating an exemplary method.

FIG. 4 is a flowchart illustrating an example method 400 for causing display of content. At a step 402, a first media control request can be received while a first content item is being outputted for display. In an aspect, the first media control request can comprise one or more of a fast forward request, a fast rewind request, a rewind request, a skip request, and the like. The first media control request can have an associated request parameter, for example, a requested viewing speed (e.g., 2×, 3×, 4×, 5×, 6×, and the like) that indicates the speed of the first content item. The first media control request can be received from user commands entered via a remote control, buttons on a user device, voice control, and/or user interface elements displayed on a user device. As an example, the first content item can be a television program, a movie, an advertisement (e.g., first advertisement), or the like. The first content item can be presented on a user device. As an example, the first media control request can be transmitted from the user device 120 to the content management system 119.

At a step 404, a time point of the first content item associated with the first media control request can be determined. As an example, the processor 127 can be configured to determine time points associated with the first media control request. In an aspect, time points can be determined by accessing metadata of the first content item. As an example, the metadata can comprise temporal data for the starting point and the ending point of a first content item, duration of the first content item, a duration of a content segment to which the first content belongs (e.g., an advertisement spot of a predetermined amount of time during which multiple advertisements can be provided), combinations thereof and the like. For example, a time point can indicate a time after a starting point and/or before an ending point of the first content item and/or content segment. In an aspect, the starting point and/or the ending point can be characterized by a specific digital sequence. For example, a starting point and/or an ending point can comprise SCTE cue packets within digital MPEG-2 content. As another example, starting points and/or ending points can be encoded cue tones identifying a splice point within analog content.

At a step 406, a second content item can be determined based on a requested viewing speed associated with the first media control request, the time point of the first content item associated with the first media control request, and the first content item. The second content item can be identified by determining a duration between the time point associated with the first media control request and an end of the first content item, dividing the duration by the requested viewing speed of the first media control request (e.g., request parameter) resulting in a target duration, and determining one or more second content items with the target duration (alone or combined). The processor 127 can be configured to determine the second content item based on the duration between the time point associated with the first media control request and the end of the first content item (e.g., first advertisement) and/or a content segment. For example, if the time point associated with the first media control request is 40 seconds before the end of the first content item (e.g., first advertisement), and the first media control request comprises a fast forward request with a 4× viewing speed, the content management system 119 can determine a second content item that would last, for example, 40 seconds divided by 4, resulting in a target duration of 10 seconds for a second content item. Similarly, if the time point associated with the first media control request (e.g. fast rewind request) is 20 seconds after the starting point of the first content item (e.g., first advertisement), and the first media control request comprises a fast rewind request with a 4× viewing speed, the content management system 119 can determine a second content item that would last, for example, 20 seconds divided by 4 resulting in a target duration of 5 seconds.

In an aspect, the second content item can be determined based on the first content item. By way of example, such identification can occur using one or more pre-determined classifications/associations. By way of example, the pre-determined classifications can be stored as metadata associated with the first content item and/or the second content item. A first content item can be associated with one or more second content items. Associations can be based on, for example, content similarity (identical or similar products and/or advertisers), region, content target audience, content length, combinations thereof, and the like. For example, the second content item can be a short-form/abbreviated (e.g., 10 second) version of the first content item (e.g., the first advertisement). In another example, the second content item can be any type of advertisement, or other content.

As an example, the second content item can be a second advertisement. In an aspect, the second content item can be an abbreviated version of the first content item. As an example, the second content item can comprise one or more of a video clip, a static image, a code, a tag, a link, combinations thereof, and the like. In an aspect, the processor 127 can determine the abbreviated version (e.g., 10-second version) of the first content item (e.g., the first advertisement) according to metadata (e.g., content theme, content type, content length) associated with the first and/or second content item.

In an aspect, a determination of a second content item can comprise determining a second content item according to user information associated with the first media control request. In an aspect, the user information can comprise user subscription information, user demographic information, viewing history, user interests (e.g., hobbies, favorite teams, political views), and/or the like. In an aspect, user information can comprise preference information. As an example, the preference information can indicate a specific user (e.g., viewer, customer) prefers a particular brand of product (e.g., a particular brand of shoes) and/or a particular class of product (e.g., automobile). Accordingly, a second content item that is relevant to the user information can be determined.

At a step 408, the first content item and the second content item can be caused to be displayed simultaneously. In another aspect, the second content item can be caused to be displayed in place of the first content item. In an aspect, the first content item can be caused to be displayed at a first speed, and the second content item can be caused to be displayed at a second speed. By way of example, the first speed can be greater than the second speed. In an aspect, a timer can be provided. The timer can indicate a time to the end of the first content item being caused to be displayed at the first speed and/or a time to the end of a content segment to which the first content item belongs (e.g., end of a commercial break). FIG. 3A through FIG. 3F illustrate various examples of relative content presentation of the first content item and the second content item that can be applied to the methods described herein.

In an aspect, a second media control request, after the first media control request, can be received from a user device (e.g., the user device 120). For example, the second media control request can be a pause request. A video frame associated with the second media control request can be determined and/or modified. In an aspect, modifying the video frame can comprise inserting one or more of a code, a tag, a link, combinations thereof, and the like. As an example, the code can be a response code. As another example, the tag can be a meta-tag. As another example, the link can be a uniform resource locator (URL). For example, if a "Pause" request is received while fast forwarding, a video frame at the time of the pause request can be determined and displayed for the duration of the pause. In an aspect, the video frame at the time of the second media control request can be modified. For example, a URL of an advertised product associated with the first content item and/or the second content item can be displayed in the video frame. As another example, a pop-up offer can be shown to a user. The modified video frame can comprise one or more user selectable elements (e.g., clickable product hotspots) and can be applied to provide interactive second screen experiences to viewers via response codes, URLs, meta-tags, and the like. Users can request further information about products being advertised, order products being advertised, and the like.

The methods can be iteratively applied to each content item that is being provided to a user. For example, in a content segment comprised of a plurality of content items, each content item can be replaced with another content item. In an aspect, a user can be provided with a plurality of abbreviated versions of advertisements as the user fast forwards through the advertisements.

Figure 5:
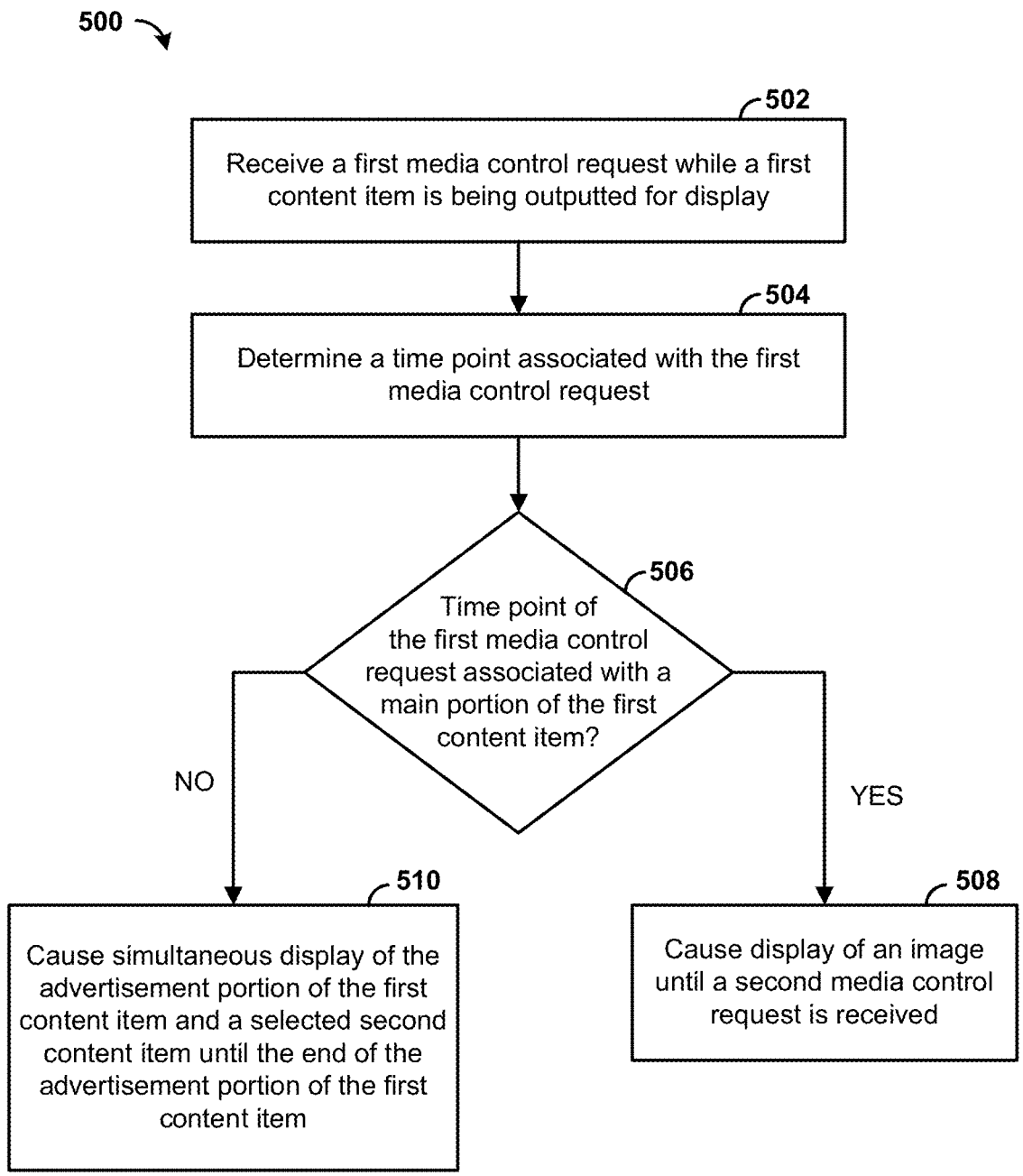
FIG. 5 is a flowchart illustrating an exemplary method.

FIG. 5 is a flowchart illustrating another example method 500 for causing display of content. At a step 502, a first media control request can be received while a first content item is being outputted for display. In an aspect, the first media control request can comprise one or more of a fast forward request, a fast rewind request, a rewind request, a skip request, and the like. The first media control request can have an associated request parameter, for example, a requested viewing speed (e.g., 2×, 3×, 4×, 5×, 6×, and the like) that indicates the speed of the first content item. The first media control request can be received from user commands entered via a remote control, buttons on a user device, voice control, and/or user interface elements. As an example, the first content item can be a television program, a movie, an advertisement, or the like. As an example, the first content item can comprise one or more main portions (e.g., sections of a movie or other non-advertisement content) and one or more advertisement portions.

At a step 504, a time point associated with the first media control request can be determined. As an example, the processor 127 can be configured to determine time points associated with the first media control request. In an aspect, time points can be determined by accessing metadata of the first content item. As an example, the metadata can comprise temporal data for the starting point and ending point of a first content item, duration of the first content item, a duration of a content segment to which the first content belongs (e.g., an advertisement spot of a predetermined amount of time during which multiple advertisements can be provided), combinations thereof and the like. For example, a time point can indicate a time after a starting point and/or before an ending point of the first content item. In an aspect, the starting point and/or the ending point can be characterized by a specific digital sequence. For example, a starting point and/or an ending point can comprise SCTE cue packets within digital MPEG-2 content. As another example, starting points and/or ending points can be encoded cue tones identifying a splice point within analog content.

At a step 506, it can be determined whether the time point of the first media control request is associated with a main portion of the first content item. For example, the processor 127 can determine whether the time point of the first media control request is during a television episode (main portion) or whether the time point is during an advertisement portion. If the time point of the first media control request is associated with the main portion of the first content item, then the method 500 can continue with a step 508.

If the time point of the first media control request is associated with the main portion of the first content item in the step 506, then, in the step 508, an image can be caused to be displayed until a second request is received. For example, when a user presses fast forward or fast rewind in a main portion of the first content item (e.g., a movie, a television episode), an image can be outputted for display. In an aspect, the image can comprise one or more of a code (e.g., a response code), a tag (e.g., meta-tag), and a link (e.g., uniform resource locator). In an aspect, the image can be a trick play version of the first content item (e.g., a blurred fast forward version). In an aspect, the image can be selected based on user information, for example, user hobby, user preference, user gender, user age group, and the like. In another aspect, the image can be selected based on the main portion of the first content item. For example, the image can comprise a "screen saver" based on the main portion of the first content item. In an aspect, a second request can be received. For example, the second request can be a play request. Upon receiving the play request, the main portion of the first content item can resume playing or the advertisement portion of the first content item can play, depending on when the user initiates the play request.

Returning to the step 506, if the time point of the first media control request is associated with the advertisement portion of the first content item instead of the main portion of the first content item, then the method 500 can continue to a step 510. At the step 510, the advertisement portion of the first content item and a selected second content item can be caused to be displayed simultaneously until the end of the advertisement portion of the first content item. In another aspect, the selected second content item can be caused to be displayed in place of the advertisement portion of the first content item. The second content item can be selected by determining a duration between the time point associated with the first media control request and an end of the advertisement portion of the first content item, dividing the duration by the requested viewing speed, and determining one or more second content items with the duration (alone or combined). FIG. 3A through FIG. 3F illustrate various examples of relative content presentation of the advertisement portion of the first content item and the second content item that can be applied to the methods described herein. In an aspect, the advertisement portion of the first content item can be caused to be displayed at a first speed and the selected second content item can be caused to be displayed at a second speed. By way of example, the first speed can be greater than the second speed.

In an aspect, a selected second content item can be determined based on the requested viewing speed associated with the first media control request, the time point associated with the first media control request, and the portion of first content item during which the request occurs. The processor 127 can be configured to determine the second content item based on the duration between the time point associated with the first media control request and the end of the advertisement portion of the first content item (e.g., first advertisement(s)). In an aspect, the advertisement portion of the first content item can comprise a single advertisement or a content segment (e.g., multiple advertisements). For example, the time point can be associated with the first media control request during an advertisement portion of the first content item, for example, if the time point associated with the first media control request is 40 seconds before the end of an advertisement that occurs in a break during a movie, and the first media control request is a 4× fast forward request, the content management system 119 can determine a second content item that would last, for example, 40 seconds divided by 4, resulting in a duration of 10 seconds. Accordingly, the second content item can be a second advertisement that has a duration of 10 seconds. As an example, the second content item can comprise one or more of a video clip, a static image, a code, a tag, a link, and the like. In an aspect, the second content item can be an abbreviated version of the advertisement portion (e.g., first advertisement) of the first content item. In an aspect, the processor 127 can determine the abbreviated version (e.g., 10-second version) of the advertisement portion of the first content item (e.g., the first advertisement) according to metadata (e.g., content theme, content type, content length) associated with the advertisement portion of the first content item and/or the second content item(s).

In an aspect, the second content item can be determined based on the advertisement portion (e.g., first advertisement) of the first content item. By way of example, such identification can occur using one or more pre-determined classifications/associations. By way of example, the pre-determined classifications can be stored as metadata associated with the advertisement portion of the first content item and/or the second content item. The advertisement portion of the first content item can be associated with one or more second content items. Associations can be based on, for example, content similarity (identical or similar products and/or advertisers), region, content target audience, content length, combinations thereof, and the like. For example, the second content item can be a short-form (e.g., 10 second) version of the advertisement portion of the first content item (e.g., the first advertisement). In another example, the second content item can be any type of advertisement, or other content.

In an aspect, a determination of a second content item can comprise determining a second content item according to user information associated with the first media control request. In an aspect, the user information can comprise user subscription information, user demographic information, viewing history, user interests (e.g., hobbies, favorite teams, political views), and/or the like. In an aspect, user information can comprise preference information. As an example, the preference information can indicate a specific user (e.g., viewer, customer) prefers a particular brand of product (e.g., a particular brand of shoes) and/or a particular class of product (e.g., automobile). Accordingly, a second content item that is relevant to the user information can be determined.

The methods can be iteratively applied to each advertisement that makes up the advertisement portion of the first content item. For example, in an advertisement portion comprised of a plurality of advertisements, each advertisement can be replaced with another advertisement. In an aspect, a user can be provided with a plurality of abbreviated versions of advertisements as the user fast forwards through the advertisements.

Figure 6:
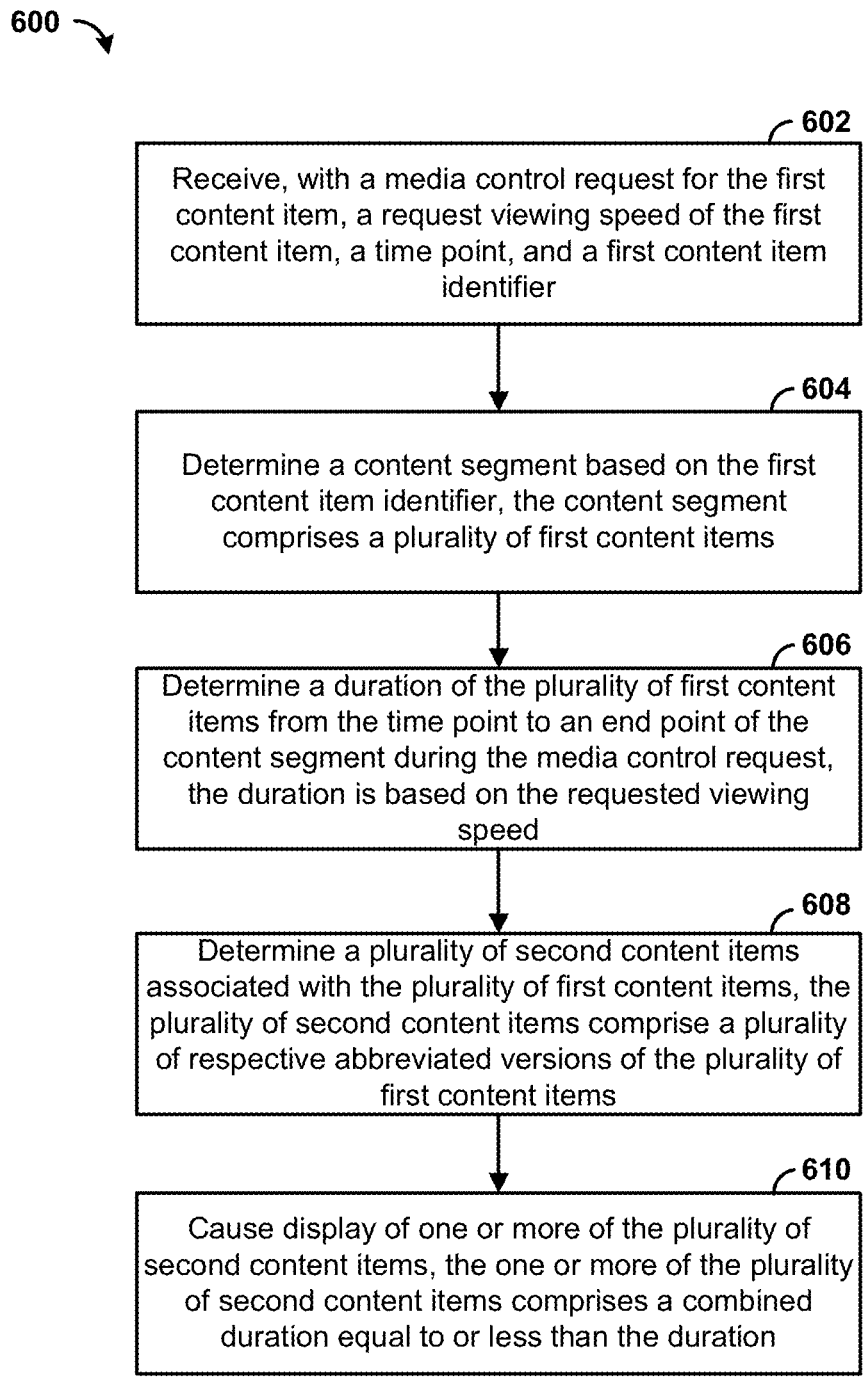
FIG. 6 is a flowchart illustrating an exemplary method.

FIG. 6 is a flowchart illustrating another example method 600 for providing content. At a step 602, a request parameter, a time point, and a first content item identifier can be received with a media control request for the first content item. The request parameter can comprise a requested viewing speed of the media control request (e.g., 2×, 3×, 4×, 5×, 6×, and the like). The media control request can utilize a trick play operation (e.g., fast forward, rewind, fast rewind). The time point can comprise a time at which a user makes a request. The first content item identifier can comprise any unique code that uniquely identifies a first content item.

At a step 604, a content segment can be determined based on the first content item identifier. In an aspect, the content segment can comprise a plurality of content items (e.g., advertisements). A database that comprises information related to which first content items (e.g., advertisements) are to be played (and when) can be utilized to determine which of many content segments is currently being provided to the user. The content segment will have a known duration, a starting point, and an ending point, all of which can be determined by accessing the database. In an aspect, the first content item identifier can comprise sufficient information to determine the content segment. In another aspect, the first content item identifier is optional and the content segment can be determined based on the time of receipt of the requested viewing speed and the time point.

A plurality of first content items associated with the content segment can be determined. The content segment can comprise several first content items. For example, a content segment can comprise, 1, 2, 3, 4, 5, 6, 7, 8, etc. . . . first content items. Each of the plurality of first content items can have an associated first content identifier. In an aspect, the plurality of first content items can be advertisements. In a further aspect, the plurality of first content items can be related or unrelated.

At a step 606, a duration of the plurality of first content items from the time point and to an end point of the content segment during the media control request can be determined. In an aspect, the duration can be based on the requested viewing speed. Furthermore, the duration can be a function of the time point, the end point of the content segment, and the requested viewing speed. For example, the time point can be subtracted from the end point of the content segment to determine a normal time duration of the plurality of first content items. The normal time duration can be the time to display the content segment at a normal viewing speed. The normal time duration can be divided by the requested viewing speed to arrive at the duration. For example, if the content segment end point is 200 seconds the time point is 20 seconds and the requested viewing speed is 3×, then the duration is 200 minus 20, resulting in 180 seconds divided by the requested viewing speed (180/3) which equals 60 seconds for the duration.

At a step 608, a plurality of second content items associated with the plurality of first content items can be determined. By way of example, such determination can occur using one or more classifications/associations. By way of example, the classifications/associations can be pre-determined, determined in real-time, or a combination of both. By way of example, the pre-determined classifications/associations can be stored as metadata associated with the plurality of first content items and/or the plurality of second content items. The plurality of first content items can be associated with one or more of the plurality of second content items. Associations can be based on, for example, content similarity (identical or similar products and/or advertisers), region, content target audience, content length, combinations thereof, and the like. For example, each of the plurality of first content items can have an associated second content item that is an abbreviated (e.g., 10, 20, 30 second) version of the first content item. In another example, the plurality of second content items can be any type of advertisement, or other content.

In a further aspect, determining a plurality of second content items associated with the plurality of first content items can comprise determining a second content item according to user information. In an aspect, the user information can comprise user subscription information, user demographic information, viewing history, user interests (e.g., hobbies, favorite teams, political views), and/or the like. In an aspect, user information can comprise preference information. As an example, the preference information can indicate a specific user (e.g., viewer, customer) prefers a particular brand of product (e.g., a particular brand of shoes) and/or a particular class of product (e.g., automobile). Accordingly, a second content item that is relevant to the user information can be determined.

At a step 610, one or more of the plurality of second content items can be caused to be displayed. The one or more of the plurality of second content items can have a combined duration equal to or less than the duration. The second content items can be caused to be displayed at a second viewing speed (e.g., normal viewing speed). In an aspect, a number of the plurality of second content items can be assembled such that the combined duration of the second content items is equal to the duration. For example, the duration can be 60 seconds and a plurality of second content items can be determined wherein the plurality of second content items combined has a duration equal to 60 seconds. In an example, a second content item comprising the duration of 60 seconds can be caused to be displayed. In another example, three content items (second content items) each comprising a time duration of 20 seconds can be caused to be displayed. In another example, two content items (second content items) comprising a duration of 30 seconds each can be caused to be displayed. In other examples other combinations of second content items that are equal or less than 60 seconds when combined can be caused to be displayed. In an aspect, the first content items can be caused to be displayed simultaneously at the requested viewing speed while the second content items at the second viewing speed are caused to be displayed. FIG. 3A through FIG. 3F illustrate various examples of relative content presentation of the first content items and the second content items that can be applied to the methods described herein.

Figure 7:
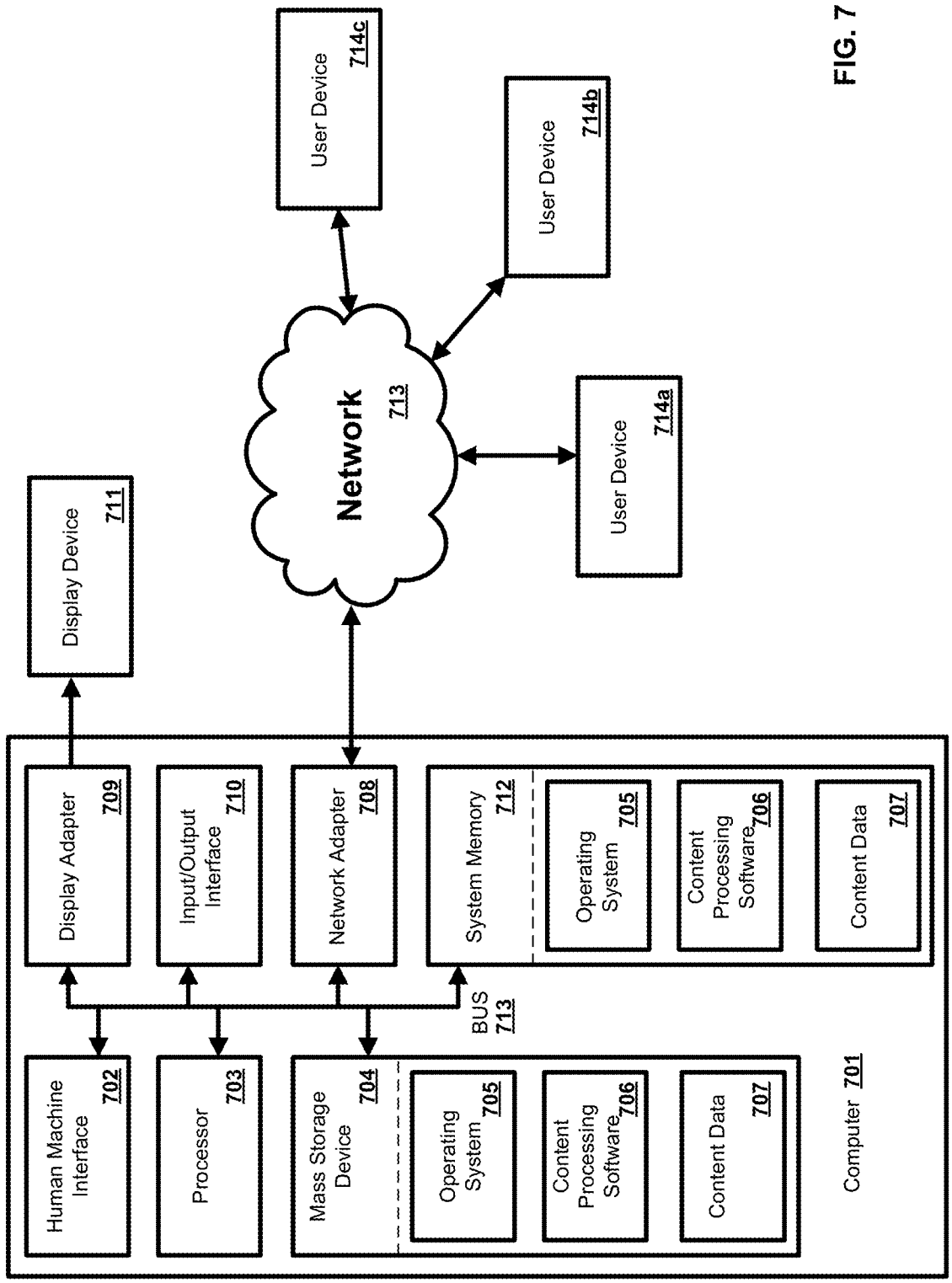
FIG. 7 is a block diagram of an exemplary system in which the present systems and methods can operate.

In an exemplary aspect, the methods and systems can be implemented on a computer 701 as illustrated in FIG. 7 and described below. By way of example, the content management system 119 of FIG. 1 and FIG. 2 can be a computer 701 as illustrated in FIG. 7. The user device 120 of FIG. 1 and FIG. 2 can be the user devices 714a, 714b, 714c as illustrated in FIG. 7. Similarly, the methods and systems disclosed can utilize one or more computers to perform one or more functions in one or more locations. FIG. 7 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 701. The components of the computer 701 can comprise, but are not limited to, one or more processors or processing units 703, a system memory 712, and a system bus 713 that couples various system components including the processor 703 to the system memory 712. In the case of multiple processing units 703, the system can utilize parallel computing.

The system bus 713 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 713, and all buses specified in this description can also be implemented over a wired or wireless network connection and each of the subsystems, including the processor 703, a mass storage device 704, an operating system 705, content processing software 706, content data 707, a network adapter 708, system memory 712, an Input/Output Interface 710, a display adapter 709, a display device 711, and a human machine interface 702, can be contained within one or more user devices 714a,b,c at physically separate locations, connected through buses of this form, in effect implementing a fully distributed system.

The computer 701 typically comprises a variety of computer readable media. Exemplary readable media can be any available media that is accessible by the computer 701 and comprises, for example and not meant to be limiting, both volatile and non-volatile media, removable and non-removable media. The system memory 712 comprises computer readable media in the form of volatile memory, such as random access memory (RAM), and/or non-volatile memory, such as read only memory (ROM). The system memory 712 typically contains data, such as the content data 707, and/or program modules, such as the operating system 705 and the content processing software 706, that are immediately accessible to and/or are presently operated on by the processing unit 703.

In another aspect, the computer 701 can also comprise other removable/non-removable, volatile/non-volatile computer storage media. By way of example, FIG. 7 illustrates a mass storage device 704 which can provide non-volatile storage of computer code, computer readable instructions, data structures, program modules, and other data for the computer 701. For example and not meant to be limiting, a mass storage device 704 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 704, including by way of example, an operating system 705 and the content processing software 706. Each of the operating system 705 and the content processing software 706 (or some combination thereof) can comprise elements of the programming and the content processing software 706. The content data 707 can also be stored on the mass storage device 704. The content data 707 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 701 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 703 via a human machine interface 702 that is coupled to the system bus 713, but can be connected by other interface and bus structures, such as a parallel port, game port, an IEEE 1394 Port (also known as a Firewire port), a serial port, or a universal serial bus (USB).

In yet another aspect, a display device 711 can also be connected to the system bus 713 via an interface, such as a display adapter 709. It is contemplated that the computer 701 can have more than one display adapter 709 and the computer 701 can have more than one display device 711. For example, a display device can be a monitor, an LCD (Liquid Crystal Display), or a projector. In addition to the display device 711, other output peripheral devices can comprise components, such as speakers (not shown) and a printer (not shown) which can be connected to the computer 701 via the Input/Output Interface 710. Any step and/or result of the methods can be output in any form to an output device. Such output can be any form of visual representation, including, but not limited to, textual, graphical, animation, audio, tactile, and the like. The display 711 and the computer 701 can be part of one device, or separate devices.

The computer 701 can operate in a networked environment using logical connections to one or more user devices 714a,b,c. By way of example, the computer 701 can be a personal computer, a portable computer, a smartphone, a server, a router, a network computer, a peer device or other common network node, and so on. As another example, the user devices 714a,b,c can comprise logical connections between the computer 701 and a user device 714a,b,c can be made via a network 715, such as a local area network (LAN) and/or a general wide area network (WAN). Such network connections can be through a network adapter 708. The network adapter 708 can be implemented in both wired and wireless environments. Such networking environments are conventional and commonplace in dwellings, offices, enterprise-wide computer networks, intranets, and the Internet.

For purposes of illustration, application programs and other executable program components, such as the operating system 705, are illustrated herein as discrete blocks, although it is recognized that such programs and components reside at various times in different storage components of the computing device 701, and are executed by the data processor(s) of the computer. An implementation of content processing software 706 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information, such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ artificial intelligence (AI) techniques, such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
receiving, by a computing device, a media control request comprising an identifier for first content;
determining a time point of the first content associated with the media control request;
determining, based on the identifier for the first content, an end point for the first content;
determining, based on the time point and the end point, a duration for the first content;
determining, based on the duration for the first content and a requested speed associated with the media control request, an adjusted duration;
determining, based on the adjusted duration, second content; and
causing output of at least a portion of the second content.

2. The method of claim 1, wherein receiving the media control request comprises receiving the media control request during the output of the first content by a user device.

3. The method of claim 1, wherein the media control request further comprises the requested speed associated with the media control request.

4. The method of claim 1, wherein the duration for the first content comprises a time interval between the time point and the end point for the first content when the first content is played at a normal viewing speed.

5. The method of claim 1, wherein the end point for the first content is at least one of: an end of a scene for the first content, an end of a content segment for the first content, or an end of the first content.

6. The method of claim 1, wherein the time point of the first content is a time indication associated with the first content when the media control request is received.

7. The method of claim 1, further comprising determining, based on the identifier, a classification for the first content, wherein determining the second content if further based on the classification for the first content.

8. A method comprising:
   receiving, by a computing device, a media control request comprising an identifier for first content;
   determining a time point of the first content associated with the media control request;
   determining, based on the identifier, a classification for the first content;
   determining, based on the time point and a speed associated with the media control request, an adjusted duration;
   determining, based on the adjusted duration and the classification for the first content, second content; and
   causing output of at least a portion of the second content.

9. The method of claim 8, wherein metadata associated with the first content comprises the classification for the first content.

10. The method of claim 8, wherein the second content is an abbreviated version of the first content.

11. The method of claim 8, wherein at least one of the first content or the second content comprises an advertisement.

12. The method of claim 8, wherein the classification for the first content may be based on at least one of: content in the first content, a product associated with the first content, an advertiser associated with the first content, a region the first content is being output, a target audience for the first content, or a time length for the first content.

13. The method of claim 8, further comprising:
   determining an end point for the first content; and
   determining, based on the time point and the end point, a duration for the first content, wherein determining the adjusted duration is further based on the duration for the first content.

14. A system comprising:
   a computing device configured to:
      receive a media control request comprising an identifier for first content;
      determine a time point of the first content associated with the media control request;
      determine, based on the identifier for the first content, an end point for the first content;
      determine, based on the time point and the end point, a duration for the first content;
      determine, based on the duration for the first content and a requested speed associated with the media control request, an adjusted duration;
      determine, based on the adjusted duration, second content; and
      cause output of at least a portion of the second content; and
   a user device configured to:
      output the at least the portion of the second content.

15. The system of claim 14, wherein to receive the media control request, the computing device is configured to receive the media control request during the output of the first content by the user device.

16. The system of claim 14, wherein the media control request further comprises the requested speed associated with the media control request.

17. The system of claim 14, wherein the duration for the first content comprises a time interval between the time point and the end point for the first content when the first content is played at a normal viewing speed.

18. The system of claim 14, wherein the end point for the first content is at least one of: an end of a scene for the first content, an end of a content segment for the first content, or an end of the first content.

19. The system of claim 14, wherein the time point of the first content is a time indication associated with the first content when the media control request is received.

20. The system of claim 14, wherein the computing device is further configured to determine, based on the identifier, a classification for the first content, wherein determining the second content if further based on the classification for the first content.

21. A system comprising:
   a computing device configured to:
      receive a media control request comprising an identifier for first content;
      determine a time point of the first content associated with the media control request;
      determine, based on the identifier, a classification for the first content;
      determine, based on the time point and a speed associated with the media control request, an adjusted duration;
      determine, based on the adjusted duration and the classification for the first content, second content; and
      cause output of at least a portion of the second content; and
   a user device configured to:
      output the at least the portion of the second content.

22. The system of claim 21, wherein metadata associated with the first content comprises the classification for the first content.

23. The system of claim 21, wherein the second content is an abbreviated version of the first content.

24. The system of claim 21, wherein at least one of the first content or the second content comprises an advertisement.

25. The system of claim 21, wherein the classification for the first content may be based on at least one of: content in the first content, a product associated with the first content, an advertiser associated with the first content, a region the first content is being output, a target audience for the first content, or a time length for the first content.

26. The system of claim 21, wherein the computing device is further configured to:
   determine an end point for the first content; and
   determine, based on the time point and the end point, a duration for the first content, wherein determining the adjusted duration is further based on the duration for the first content.

* * * * *